(No Model.) 5 Sheets—Sheet 1.

J. BRADY & J. R. VELLACOTT.
TYPE WRITING MACHINE.

No. 426,360. Patented Apr. 22, 1890.

Fig. 1.

(No Model.) 5 Sheets—Sheet 2.

J. BRADY & J. R. VELLACOTT.
TYPE WRITING MACHINE.

No. 426,360. Patented Apr. 22, 1890.

Fig. 2.

Witnesses.
Robert Pruitt,
J. A. Rutherford.

Inventors.
James Brady
James R. Vellacott.
By
James L. Norris.
Atty.

(No Model.) 5 Sheets—Sheet 3.

J. BRADY & J. R. VELLACOTT.
TYPE WRITING MACHINE.

No. 426,360. Patented Apr. 22, 1890.

(No Model.)  5 Sheets—Sheet 4.

J. BRADY & J. R. VELLACOTT.
TYPE WRITING MACHINE.

No. 426,360.  Patented Apr. 22, 1890.

Witnesses
Robert Emmett,
J. A. Rutherford.

Inventors.
James Brady
James R. Vellacott
By James L. Norris
Atty.

UNITED STATES PATENT OFFICE.

JAMES BRADY AND JAMES R. VELLACOTT, OF BROOKLYN, NEW YORK, ASSIGNORS TO THE FITCH TYPE-WRITER COMPANY, OF DES MOINES, IOWA.

TYPE-WRITING MACHINE.

SPECIFICATION forming part of Letters Patent No. 426,360, dated April 22, 1890.

Application filed July 19, 1888. Serial No. 280,386. (No model.)

*To all whom it may concern:*

Be it known that we, JAMES BRADY and JAMES R. VELLACOTT, citizens of the United States, residing at Brooklyn, in the county of Kings and State of New York, have invented new and useful Improvements in Type-Writing Machines, of which the following is a specification.

This invention has for its objects to simplify and improve the construction and operation of the type-writer for which Letters Patent No. 366,577 were issued July 12, 1887, to Eugene Fitch; to provide novel means for effecting a variable line-space feed; to provide a novel stop for the spacing-ratchet to prevent the momentum of the impression-cylinder from carrying it beyond the proper point; to provide a novel paper rack or receiver; to provide novel means whereby a variable letter-space feed may be given to the impression-cylinder to provide an ornamental border or to space out more widely the numerals or other devices or symbols commonly employed in type-writers; to provide novel means whereby the type-arms are positively restored to their normal position in the rank of the type-carriers, and to otherwise improve type-writers, as will be fully hereinafter described, and set forth in the claims, reference being made to the accompanying drawings, illustrating the invention, in which—

Fig. 16 is a detail perspective of the stationary guides. Fig. 17 is a detail section to show the construction of the nuts connecting the stationary guides to the machine-frame. Fig. 18 is a detail section of one of the type-blocks and its hinged carrying-plate. Fig. 18$^a$ is a detail section, enlarged, of the end of the carrying-plate shown in Fig. 18, illustrating the manner of connecting the link thereto. Fig. 19 is a detail perspective of one of the carrying-plates detached. Fig. 20 is a bottom plan view, partly in section, of several of the hinged carrying-blocks arranged in rank, showing the action of the beveled shoulders in restoring the type-arms to place. Fig. 21 is a detail perspective of the paper-clamp detached. Fig. 22 is a central section of one of the rolls supporting the paper-carriage. Fig. 23 is a detail view of the oiler and wiper removed from their chambers in the machine-frame. Fig. 24 is a front elevation, partly in section, of part of the guides between which the key-bars vibrate, showing their construction and manner of attachment. Fig. 25 is a detail view of a modified construction of the guide-fingers shown in Fig. 24. Figs. 26 and 27 are detail views of a modification of the inking devices.

In the said drawings the reference-numeral 1 designates the frame of the machine, resting upon legs 2, which, as shown, are four in number, though we may employ either more or less.

At the rearward portion of the frame 1 is arranged a frame consisting of two substantially vertical arms 3, having at their upper ends two forwardly-inclined arms or bars 4. The bars 3 are pivotally mounted near their lower ends between journal-pins 5, below which is rigidly connected an arm 6, extending forward and having at its free end a cross head or lug 7, extending on both sides of the arm.

At the angle between the arms 3 and the inclined arms 4 is mounted a shaft 8, upon which the type-carrying plates 9 are mounted. These plates, which will be more particularly described hereinafter, each have a rearwardly-projecting lug 10, to which is pivotally attached the link 12, by which the type-arms are connected with the key-bars 13.

Mounted upon the parallel arms 3 is a plate 14, having a forwardly-projecting plate 15, provided at regular intervals with slots 16, between which the links 12 have movement, guidance, and lateral support.

The type-arms 17 have threaded ends upon which the type-blocks 18 are screwed, each type-block having two active faces, upon each of which several characters are arranged, either face being brought into position by partly revolving the block upon the arm 17. The type-carriage is normally thrown or tilted forward by a spring 19 acting upon the arm 6.

Mounted upon a pivot or fulcrum 20 are two levers 21 and 22, the ends of which lie beneath the lug or cross-head 7 upon the arm 6. One of these levers is provided with a stop-lug 23, by which its movement is limited, the throw of said lever being sufficient to tilt the type-carriage backward far enough to bring the middle line of type upon the type-blocks into operative position relative to the impression-roll. The throw of the other lever 22 is sufficiently greater to bring the outer line of type into printing position. A key 24 is mounted upon the frame in position to engage with the key-lever 21 and hold the same in its depressed position permanently. The key-bars are restored to normal position by springs 25, which also raise the type-arms, carrying the latter into a single rank, wherein each type-arm is received by a notched plate 26, mounted on the extremities of the arms 4.

Mounted upon the frame 1 in front of the type-carriage is a rigid guide-frame composed of two uprights 27, having their upper extremities bent over forward and then inclined downward and toward each other until they approximate contact, only sufficient space being left to allow one of the type-arms 17 to pass. The ends of the arms are carried downward for a short distance in parallelism and are secured to a block 28, or held together by a screw. As the type-arms are depressed by the operation of the keys, they are directed by the inclined portions 27$^a$ of the frame and pass into the space between the parallel vertical ends, all the type-arms being thereby brought down relatively to the impression-cylinder at the same point. As the type-arms are restored to position by the action of the springs 25, it is essential that positive means be provided for guiding each arm back into its individual position in the single rank of type-arms. For this purpose we have provided the following devices: Each type-arm 17 is hinged or pivotally mounted upon a flat plate 9, Fig. 19. These plates are mounted upon the shaft 8, parallel with each other, and are each provided with an upper and a lower lug 30 and 31, respectively, each lug having an aperture 32. A central projection 33 is formed between the lugs and provided with a half-round notch 34, which coincides with the apertures 32. The end of the type-arm 17 is united to a plate 35, having a notch at its end which receives the central projection 33, while the parts 36 lie in the spaces between the lugs 30 and 31 and the central projection, a pivot-pin 37 passing through the parts and lying in the notch 34 of the projection 33.

Figures 16, 17, 18, 18A, 19, 20, 21, 22, 23, 24, 25, 26, 27:
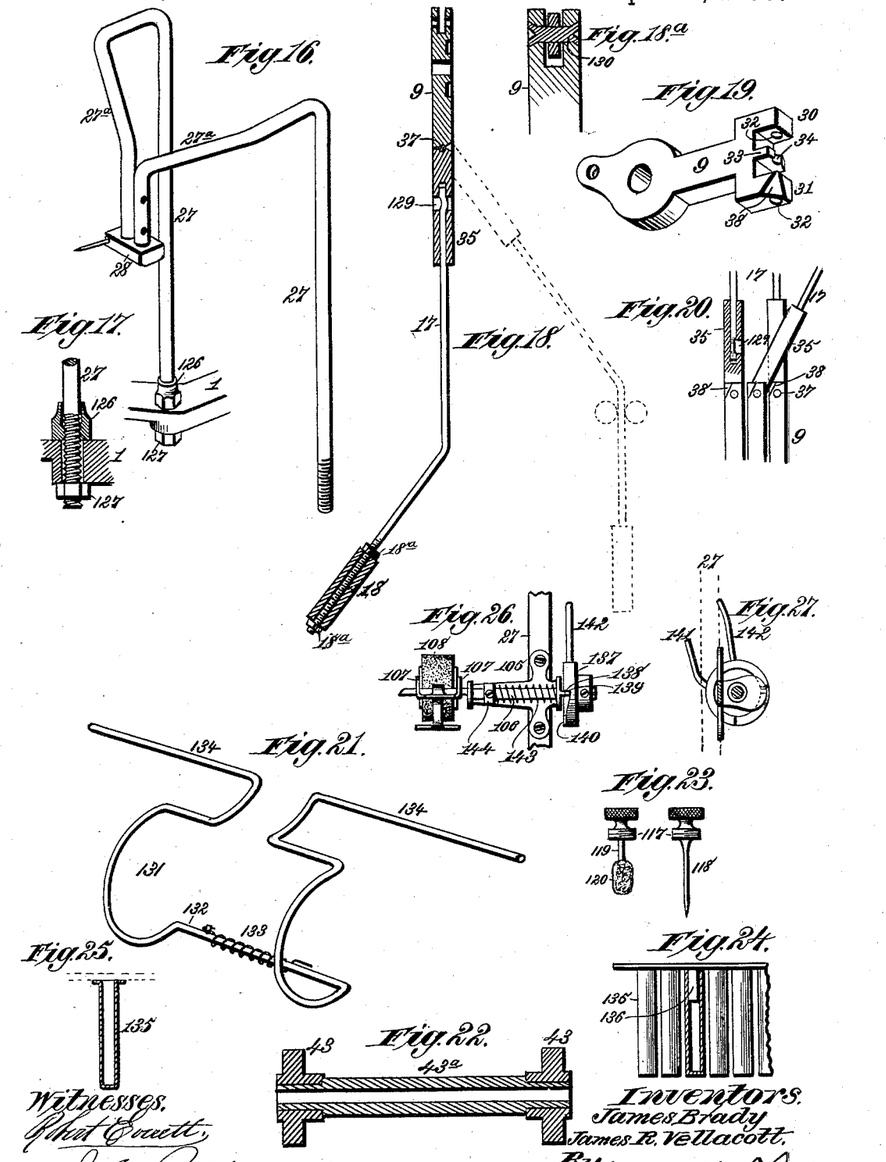

Upon the side of the notch 34 toward which the type-arm swings, the edge of the projection 33 is beveled off at an angle equal to that which the arm must assume in reaching the vertical slot in the rigid frame 27. Thus, as the inclined arm or guide 27$^a$ brings the type-arm over the slot the beveled shoulder of the projection 33 and the shoulder of the plate 35, which shoulder lies or is formed between the forked ends 36, meet, preventing the type-arm from flying beyond the vertical slot of the guide. The lower lug 31 of the flat plate 9 has a beveled corner 38, the surface so formed being of such angularity as to accurately swing the adjacent type-arm laterally as it rises to its place and bring it into proper position between the arms upon each side, as shown in Fig. 20. These beveled surfaces 38 are formed upon the lower lug of each of the flat plates 9, the angularity of each decreasing from the ends of the single line of type-carrying arms toward the center, the arm lying in the center and in line with the slot having no lateral swing or movement.

Rising from the frame and crossing the same transversely are the paper-carriage ways 39, having horizontal channels 40, which receive the flanges 41 on the carriage 42, by which the latter is held upon the supporting-rolls 43, journaled in the ways 39.

The letter-space feed of the carriage is produced by the following means. Rising from the ends of the carriage-frame 42 are lugs 44, in which is pivotally mounted a rack-plate 45, having at the right-hand end a lever 46, by which the rack-plate may be rocked upon its pivots to raise or lower its toothed edge. Upon the rearward part of the two parallel ways 39 is mounted, Fig. 12, a holding-plate 47, having a rack-section 48, and upon said plate is fulcrumed an escapement or spacing lever 49, having upon one end a gear-toothed sector 50. This lever is in the form of a bell-crank, having its fulcrum 51 at the angle of the two arms, and it is normally thrown by a spring 52 in such direction that its gear-teeth 50 move toward the right until the arm carrying them is arrested.

In the edge of the plate 47 is formed a notch 54, within which lies a bar 58, carried by a link 55, the lower end of which has a loop 56 engaging with the rest-bar 57, which lies beneath the key-bars, crossing them transversely, and is depressed with each downward stroke of the keys. Near the upper end of the link 55 is formed a chamber or pocket, through which extends the reduced end of the bar 58, the upper part of the bar being enlarged and of rectangular form to prevent its turning. Above the chamber or pocket the link extends in the form of a lug, which comes in contact with plate 47 when in its normal position, forming a stop to hold the rack 45 in position to engage the teeth of lever 49, by means of the rollers hereinafter described.

Upon the front face of the link-bar are mounted two anti-friction rolls 59, a sufficient interval being left between them to admit in edge of the rack-plate 45. Surrounding that portion of the link-bar passing through the chamber or pocket in link 55 is a coiled spring 60, resting on a cross-pin 61 in bar 58. By this arrangement each downward stroke of the rest-bar 57 will rock the plate 45, drawing its teeth into engagement with the rack-section 48, leaving the lever 49 free to vibrate to the right. As the rest-bar 57 again rises, the teeth of the rack-plate 45 engage the teeth 50 on the lever, and as the rack-plate becomes disengaged from the rack-section 48 the feed-spring in the drum 63, hereinafter described, draws the rack-plate, and with it the carriage on which it is mounted, toward the left as far as the stroke or swing of the lever 49 will permit. By means of the spring 60 a yielding connection is provided to permit the rack-plate 45 to be rocked or tilted upward by means of the key-bar 46 far enough to entirely disengage it from lever 49, to allow the carriage to be drawn back to begin another line or moved to any particular point for interlineation or cancellation of matter written. By means of the spring 60 a yielding connection is provided, whereby, in case of an interference between the teeth of the rack-plate and those of the rack-section 48, a breakage of the parts will be avoided and a complete operative stroke of the key and type-arm will be permitted. The paper-carriage is impelled from right to left by a cord, wire, or other flexible connection 62, coiling upon a drum 63, mounted on the end of the carriage and containing a spiral spring which is brought into tension by sliding the carriage from left to right.

Upon the arm 49$^a$ of the lever 49 is mounted a pin 64, and upon the rearward way-plate 39 is arranged a bar or plate 65, sliding longitudinally in keepers 66, the end of which may be brought to impinge upon the pin 64 behind the latter in such manner as to shorten the recovery-stroke of the spacing-lever 49.

Lying in a slot in the edge of the way-plate and beneath the plate 47 is a plate 67, carrying a pin 68, which projects up through a slot 69 in the plate 47, said slot being formed near the toothed arm of the spacing-lever, in the adjacent edge whereof a half-round recess 70 is formed. The plate 67 is connected to the vibratory type-carriage by means of an arm or link 71, whereby the adjustment of said carriage to bring the larger type or capitals into action will bring the limit-pin 68 opposite the recess 70 in the lever 49 and permit the latter to make a longer stroke, the difference being adapted to the increased space required for the large letters. The further adjustment of the type-carriage to bring the outer series of type into action will draw the plate 67 still farther toward the rear, carrying the limit-pin 68 past the recess 70 and restoring the normal stroke. The shortest spacing is effected by throwing the bar 65 into engagement with the pin 64 on the lever. This limits the feed to the space of a single tooth only of the rack-plate, and causes a constant and uniform interference or overlapping of the impressions, the purpose being to enable the operator to form ornamental borders by the constant repetition of the same impression or to enable him to effectually cancel any printed matter without producing an unsightly appearance.

Figures 12, 13, 14, 15:
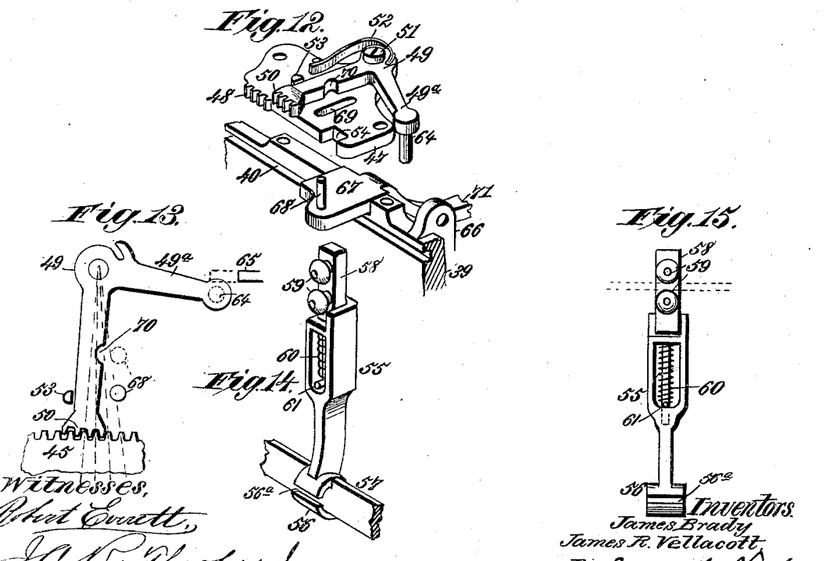
Fig. 12 is a detail perspective of the escapement-lever and the adjustable feed-limit plate, the parts being separated, but represented in proper relative position.
Fig. 13 is a plan view of the escapement-lever, showing the several variable degrees of feed to which it may be adjusted.
Fig. 14 is a detail perspective of the link connecting the rest-bar to the oscillating rack.
Fig. 15 is a front elevation of the parts shown in Fig. 14.

The three several adjustments described are indicated by the dotted lines in Fig. 13, radiating from the pivotal axis of the spacing-lever 49.

Rising from the paper-carriage 42 are arms or brackets 72, in which the journals 73 of the impression-cylinder 74 have bearing. Upon the projecting journal at the right of the carriage is mounted a ratchet 75, having a female thread which engages with the male thread on the journal. A milled nut 77 is then turned up against the face of the ratchet, locking it in place and holding it rigid upon the shaft.

Upon a boss 78 is fulcrumed the line feed-lever having two arms 79 and 80, forming an angle with each other, the fulcrum 81 being at the apex. One of these arms 79 is provided with the finger-plate 82, and upon the extremity of the other arm 80 is mounted the double pawl 83, the pivot-pin 84 of said pawl being at or near its center. A spring 85, coiled upon a boss 86, normally raises the forward arm 83$^a$ of the pawl to throw it into engagement with the teeth of the ratchet 75. A spiral spring 87 is coiled upon the boss 88, in which lies the fulcrum-pin 81, the end of said spring engaging the arm 79 of the lever and raising it to retract the pawl after each stroke. A stop-lug 89 is formed at the angle of the line feed-lever to engage the rear edge of the carriage and limit the recovery movement of the lever.

Figures 3, 4:
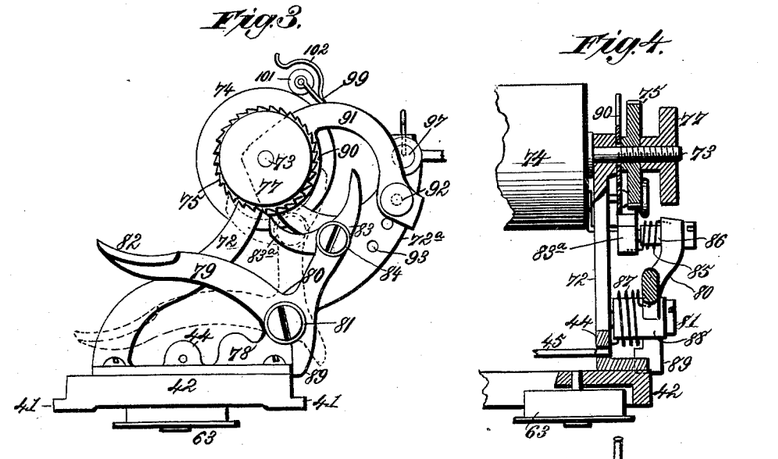
Fig. 3 is a detail end elevation of the impression-cylinder with the parts effecting the variable line-space feed.
Fig. 4 is a partial end elevation of the impression-cylinder with the line-spacing devices, the feed-ratchet, and the binding-nuts in section.

Upon a boss on the bracket 72, surrounding the journal of the cylinder, is loosely mounted a segmental plate 90, arranged between the bracket-arm and the ratchet, the edge of said plate projecting slightly beyond the teeth of the latter. Upon this plate is formed an arm 91, which curves over toward the rear, its end lying adjacent to the face of the rearward extension 72ª of the bracket-frame 72. In the end of the arm 91 is mounted a pin 92, the end of which is adapted to engage a series of apertures 93 in the bracket 72ª, whereby a successive rotary adjustment may be given to the segment-plate. The projecting portion or edge of the segment-plate 90 extends through an arc of about ninety degrees, and is so arranged that when the pin 92 is in engagement with the upper one of the series of apertures 93 the edge of the said plate will be so far turned to the rear that it will not interfere with the effective stroke of the engaging arm 83ª of the pawl 83, the nose of said arm being of such width as to not only engage the teeth of the ratchet, but also extend beyond the vertical plane of said segment-plate. If, however, the arm 91 be turned downward, the plate will be rotated upon the journal 73 and its edge advanced in such manner that as the pawl swings forward its nose will engage said plate and slide a certain distance thereon before passing off the same. As the vibration of the line-space lever is always the same, it will be seen that the effective stroke of the pawl may be varied by the several adjustments of the arm 91. The adjustment shown in Fig. 5 will give the least line-space, while that shown in Figs. 1 and 3 affords the maximum. When the segment-plate is adjusted to give the maximum stroke, as in Fig. 3, the nose 83ª of the pawl rests upon the edge thereof at the end, holding the pawl out of engagement with the ratchet and permitting the paper-cylinder to be turned in either direction. By properly spacing the teeth of the ratchet and the interval between the apertures 93 the line-space may be varied to any degree desired.

In order to prevent the momentum of the paper-cylinder from carrying it beyond the point to which it is moved by the actual throw of the pawl, we so form the rearward arm of the latter that as the line feed-lever approaches the limit of its operative stroke the said arm or tail of the pawl strikes the projecting edge of the segment-plate 90, drawing the nose of the other part closely against the back of the tooth on which it lies. Any further pressure upon the finger-plate 82 only renders this engagement more complete, thereby affording not only a stop to movement of the lever, but effectually preventing any feed movement of the cylinder in excess of that imparted by the pawl itself.

In rear of the impression-cylinder 74 is the paper receiver or rack 95, which consists of a series of similar wire coils 96, having one end mounted on or attached to a supporting-bar 97, mounted upon the upper extremities of the bracket-extensions 72ª and arranged in parallelism with the impression-cylinder. From the several points of attachment the wire is curved or coiled rearward and downward, Fig. 8, and then brought up beneath the supporting-bar 97, at which point a loop 98 is formed extending toward the impression-cylinder. The end of the wire is then curved in parallelism with the other end and spirally beneath the same, space being left between the coils for the free passage of the paper as it comes from the cylinder. The loops 98 serve to receive and guide the edge of the sheet as it is fed from the impression-cylinder, and as it enters the rack the free spirally-coiled ends support the sheet and finally prevent its printed surface from coming in contact with that portion lying between the free ends and the parallel curved portions of the rack.

Figures 5, 6, 7, 8, 9, 10:
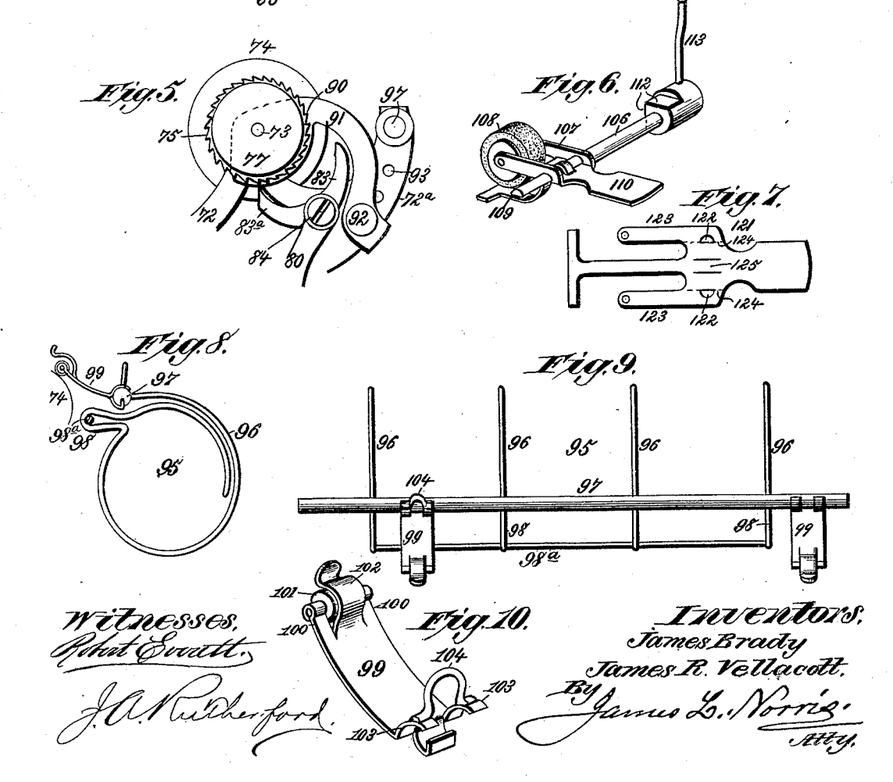
Fig. 5 is a detail end elevation of the impression-cylinder and line-spacing devices, showing the adjustment of the latter.
Fig. 6 is a detail perspective of the ink-roller and frame with its supporting-shaft.
Fig. 7 is a plan view of the blank from which the ink-roller frame is formed.
Fig. 8 is a detail end elevation of the paper-receiver with one of the pressure-rollers.
Fig. 9 is a plan view of the parts shown in Fig. 8.
Fig. 10 is a detail perspective of one of the pressure-rollers detached.
Figure 11:
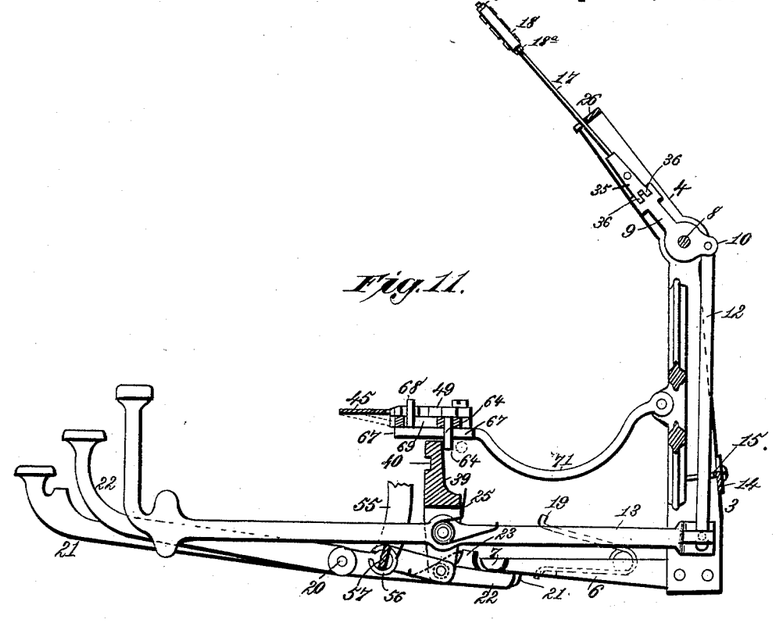
Fig. 11 is an end elevation, partly in section, showing the type-shifting keys, one of the key-bars, the type-arms and their support, and the oscillating rack and its immediate adjuncts.

Upon the supporting-bar 97 are mounted roll-carriers consisting of flat curved plates 99, Fig. 10. These plates are cleft at both ends, forming at one extremity the bearings 100, which receive the journals of the roll 101. The central section 102, which is of a width equal, or substantially so, to the length of the roll, is curved upward in nearly semicircular form to shield the surface of the roll, and the end is bent into suitable form to provide a hand-hold for raising the roll off the cylinder and guiding the end of the paper under the roll. The plate is of elastic metal, to permit the lifting of the rolls and to enable the latter to bear upon the cylinder with the necessary tension. At the other end of said plate 99 the outer cleft portions 103 are curved upward to partly embrace the supporting-bar 97, while the middle section is curved in an opposite direction and its extremities bent vertically to enter a longitudinal slot formed in the under surface of the bar 97. A wire loop 104 is soldered upon this end of the hand-plate to afford a hold, whereby suitable lateral adjustment may be given to said plate. It will be seen from the construction shown in Fig. 10 and already set forth that these adjustments may be made without interfering with the attached ends of the rack-wires 96, which project from the rearward face of the supporting-bar, and are therefore out of the way of the parts 103 and 104. As the adjustment of these plates is practically limited by the length of the supporting-bar 97, only a sheet of any desired width may be printed upon this type-writer.

Upon the rear way-plate 39, at the left of the machine, is pivotally mounted a stop-plate 137, having a detent 138 on each side of the pivoted point. A tooth 139, dropping from the under side of this plate, engages a lug 140, having several notches to hold the stop-plate at any point to which it is adjusted. By bringing one or the other of the detents 138 into proper position the paper-carriage may be arrested at corresponding points, thereby enabling the carriage to be used with three different widths of paper.

The type are inked by the following means: Upon the stationary guide-frame 27, at one side, is mounted a bracket-plate 105, having lugs in which is mounted a shaft 106, Fig. 6. Upon the forward end of this shaft is mounted rigidly the ink-roll frame, consisting of two parallel arms 107, in the ends of which the ink-roll 108 is journaled, a shield-plate 109 extending beneath the roll to prevent blurring by the accidental contact of the paper. A rearward extension 110 provides a convenient means or handle for removing the roll for supplying fresh ink. The rearward end of the shaft 106 is enlarged and provided with two flat faces 112, which form an angle with each other of ninety degrees. Upon the extremity of the enlarged portion of the shaft is mounted an arm 113. The shaft 106 is arranged to lie in substantial parallelism with the type-arms as the latter enter the vertical slot or channel between the ends of the guiding-arms. Lying as it does upon one side of this channel, the axis of the roll 108 will be substantially in the path of the type-blocks as they descend, and the latter will strike the roll in such manner as to fully ink the type-surface. As the contact takes place the blow of the type-block rotates the shaft 106, turning the inking-roll out of its path and imparting a slight rotation thereto, and allowing the arm to descend to bring the type upon the impression-cylinder. Upon the guide-frame is mounted a light spring 114, which bears against the annular faces 112 on the enlarged end of the shaft 106. The tension of this spring is so light as to permit the shaft to turn with a slight impact upon the roll, but is sufficient to hold the shaft in either of the two positions, wherein the spring makes full engagement with either flat face 112. As the type-arm falls and the type-block 18 passes the roll 108, throwing the latter downward and to one side, the arm 113 turns with the shaft and lies directly over the type-arm. As the latter rises it strikes this arm and restores the inking-roll to its normal position in readiness for another stroke. The manner of constructing these parts will be shown hereinafter.

Figure 1:
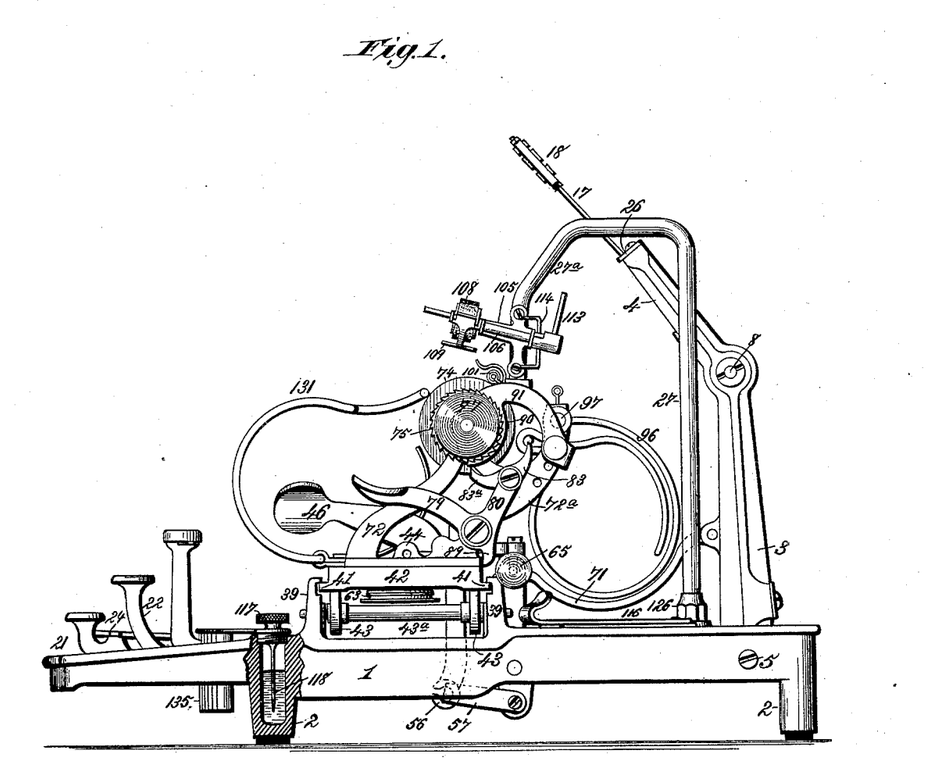
Figure 1 is an end elevation of a type-writer containing our invention, showing also the interior construction of one of the supporting-legs.
Figure 2:
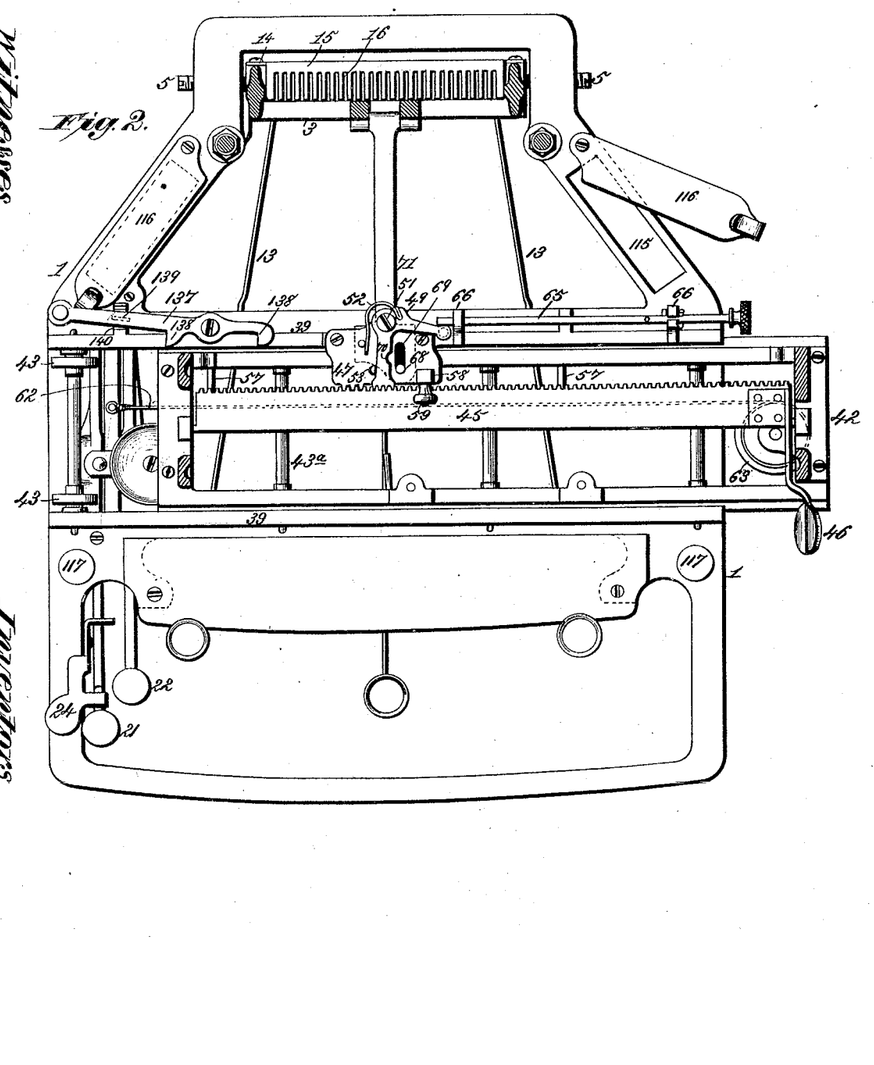
Fig. 2 is a sectional plan view of the parts shown in Fig. 1.

We utilize the rearward portions of the frame 1 as reservoirs or ink-pad boxes for the ink by forming chambers 115 therein, covers 116 being pivotally mounted on the frame and adapted to swing over and close said chambers. We also utilize the legs 2 as receptacles for oil and for the sponge or wiper used in cleaning the machine. These parts are cast hollow or bored out, as shown in Fig. 1, and are closed by screw or other plugs 117, one of which may carry an oiling-needle 118, while the other serves as a handle for the spindle 119, carrying the wiper 120.

For convenience and cheapness of construction we form the ink-roll frame in the following manner: A blank 121 is struck out from a flat plate of metal by a single stroke of a die, said blank having the semicircular openings 122 and having two parallel clefts 125 in the transverse line of these openings. This blank is then completed by bending the lateral portions upon the dotted lines 124, Fig. 7, until they stand at right angles with the body portion, thereby forming the arms 107 of the frame. The central cleft portion 125 is then drawn upward into semicircular form and the shield is bent or curved downward and outward into proper form. The end of the shaft 106, upon which the frame is mounted, is half-round and fits the similarly-shaped openings 122, passing also under the loop 125. This gives a rigid attachment to said frame and at the same time permits it to be drawn off to supply fresh ink and be readily replaced. The link 55 is connected to the rest-bar 57 in the manner shown in Fig. 14. Its end is formed into a nearly-circular loop 56, having a slot 56$^a$, wide enough to admit the rest-bar or plate 57, which is provided with a notch with which the loop engages. The parts may be engaged and disengaged by simply turning the rest-bar until its edge can pass out of the slot 56$^a$. The rigid guide-frame 27 is mounted by passing its ends through openings in the frame 1. These ends are threaded and receive nuts 126, which rest upon the frame, while nuts 127 are turned upon the lower ends and clamp against the under face of the frame. The nuts 126 are slightly countersunk from their tops downward for about half the length of the opening to permit the top of the nut to pass above and conceal the threads on the standards 27.

In uniting the type-arms 17 to the hinged-plates 35 we may use the construction shown in Fig. 18, wherein a hole is drilled longitudinally in the end of said plate to receive the end of the type-arm. An opening 129 is then drilled through said plate crossing the longitudinal aperture. The arm being then inserted in the latter, a punch is placed against that portion exposed by the opening 129, and a blow of a hammer bends the arm out of line, as shown, securely fastening it and preventing it from turning. As a modification of this construction the opening 129 may be bored with square-end drill to cross the longitudinal aperture. The arm being inserted the exposed portion is flattened by a punch to fit seat made by square-end drill, as shown in Fig. 20. The links 12 are pivotally connected to the plates 9 by pivot pins or tubes 130. The openings in the plate being slightly countersunk upon their outer faces, the ends of the pivot are spread to fill the countersink by a conical-pointed punch, as shown in Fig. 18$^a$. To remove these pins a punch of a diameter equal to that of the body of the pin is placed upon one end of the latter and the pin is driven out, the spread end being drawn down in passing the contracted portion of the opening.

The paper-holder 131 is formed of a single piece of wire, the central portion forming the axis 132, upon which a spring 133 is coiled to bind the arms 134 against the impression-cylinder. Between the axis of these arms the wire is bent or curved outward at each end of the axial portion, forming a rack for the paper, wherein the sheet may be conveniently coiled and from which it is fed to the type.

In forming the roller-supports for the paper-carriage we turn down the ends of the tubular shafts $43^a$ and mount the rolls 43 thereon, as shown in Fig. 22, either shrinking them on or threading the engaging surfaces. The supporting-rolls on the tubular axle are held in position by journals forced into the guides 39. This is a convenient and inexpensive method of construction.

The guide-fingers 135, between which the key-bars move, are formed as shown in Fig. 24, each being a tube closed at the lower end, the other end receiving a nipple 136 depending from a plate mounted on the machine-frame. We may form the guide-rack for the key-bars of tubes having a flange or collar at their ends, as shown in Fig. 25, and insert them through openings in the supporting-plate.

The pivots 130 (shown in Fig. $18^a$) may be formed of short sections of tubing instead of being solid, as shown.

The type-blocks 18, Fig. 18, are preferably slipped upon the threaded ends of the type-arms 17, a nut $18^a$ being turned up against each end of the type-block. This construction permits a very delicate adjustment of the type-blocks, besides cheapening their construction, as the necessity of cutting a female thread in each is avoided. We may, however, thread these blocks to mesh with the threaded ends of the type-arms and employ the jam-nuts 18* besides.

The paper-rack 96 is stiffened by a bar $98^a$ passed through the loops 98, Figs. 8 and 9, and soldered or otherwise fastened in place.

Instead of the type-inking devices hereinbefore described, we prefer to use the modification shown in Figs. 26 and 27, consisting of the following parts: Upon the stationary guide-frame 27 is mounted a bracket-plate 105, having lugs, in which is mounted a shaft 106. Upon the forward end of this shaft is rigidly mounted the ink-roll frame consisting of two parallel arms 107, in the ends of which the ink-roll is journaled, a shield extending underneath to prevent blurring by the accidental contact of the paper, and a rearward extension or handle 110 to remove the roll for supplying fresh ink. These parts are not essentially different from those already shown and described. On the rearward end of the shaft 106 is rigidly mounted a face-cam 137, engaging with the projection 138, fixed to or formed on the rearward lug of bracket 105. That portion of the cam-face that comes in contact with the projection 138 on the lug of the bracket is of spiral form of gradually-decreasing angularity from the shoulder or stop 139, which rests against the projection 138, when the ink-roll is in its normal position, to the other shoulder or stop 140, which limits its movement in that direction. From the periphery of the cam project two arms 141 and 142, the functions of which will be hereinafter shown. Around that portion of the shaft 106 lying between the lugs that form its bearings is a coiled spring 143, compressed between the rearward lug and a collar or sleeve 144, held by a screw to the shaft 106. This spring tends to hold the cam against the projection 138, and by moving the collar or sleeve the resistance offered to the type-block in its downward passage can be regulated as desired. The shaft 106 is arranged to lie in substantial parallelism with the type-arms as the latter enter the vertical slot or channel between the stationary guides. Lying as it does upon one side of this channel, the axis of the ink-roll when in its normal position, as shown in Figs. 25 and 26, will be substantially in the path of the type-blocks as they descend, and the latter will strike the roll in such a manner as to fully ink the type-surface. As the contact takes place, the blow of the type-block rotates the shaft 106, turning the ink-roll out of its path and imparting a slight rotation thereto and allowing the arm to descend to bring the type upon the impression-cylinder. As the type-arm falls and the type-block 18 passes the roll 108, throwing the latter downward and to one side, the two arms 141 and 142 turn with the shaft, one arm being then on each side of the type-arm. The arm 141, by coming in contact with the type-arm, prevents the ink-roll from obstructing the upward passage of the type-arm should the ink-roll have a tendency to rebound from the shoulder or stop on the cam that limits its movement in that direction when struck an unusually-violent blow. The other arm 142 now lies directly over the type-arm and as the latter rises it strikes this arm, restoring the ink-roll to its normal position, in readiness for another stroke.

The manner of constructing the several parts described does not essentially differ from that already set forth, the ink-roll frame being formed from the blank shown in Fig. 7. The cam 137 is mounted on the rearward end of shaft 106, to which it is clamped by a set-screw.

What we claim is—

1. In a type-writer, the combination, with the impression-cylinder, of a segmental plate loosely mounted on the journal thereof adjacent to the ratchet, and a line feed-lever carrying a double-armed pawl adapted to engage both ratchet and plate, the latter having an adjusting-arm, the tail of the pawl being adapted to abut against the edge of the segmental plate during the last part of the effective stroke of the lever and bind the nose of the pawl against the ratchet, substantially as described.

2. In a type-writer, the combination, with the paper-carriage having a vertically-vibrating rack-plate, of a horizontally-vibrating spring-actuated elbow-lever having a section of the gear-teeth on one arm, a holding-plate having a section of rack-teeth below the space-lever, a spacing-plate having a pin projecting through a slot in the holding-plate beside the toothed arm of the lever, a vibrating type-carriage to which said spacing-plate is connected, and means for vibrating the rack-plate at each stroke of a key, the toothed arm of the elbow-lever having a recess with which the pin on the spacing-plate may be adjusted to engage, substantially as described.

3. In a type-writer, the combination, with a paper-carriage having a vibrating rack-plate, of an oscillatory bell-crank lever having one arm provided with rack-teeth and the other arm with a projecting pin, a spring vibrating the lever in one direction, a holding-plate having a section of rack-teeth, and a movable bar or plate mounted on the carriage-way and adapted to be adjusted to impinge against the pin of the bell-crank lever to limit the stroke of the latter, substantially as described.

4. In a type-writer, the combination, with a rigid frame having inclined arms leading to a vertical channel to guide the type-arms, of a series of type-arms arranged in a single rank upon a straight shaft, each arm being carried by a flat plate turning on the shaft, the hinged parts having two square shoulders on one side of the pivotal axis and two beveled shoulders on the opposite side thereof to limit the lateral swing of the type-arm in both directions, substantially as described.

5. In a type-writer, the combination, with a rigid frame having two inclined converging arms leading to a vertical channel which guides the type-arms, of a series of type-arms arranged in a single rank, each type-arm being carried by a flat plate mounted on a straight shaft and having lugs between which the plate carrying the type-arm is hinged or pivoted, one of said lugs having its lower corner beveled off at an angle corresponding with the lateral swing of the type-arm as it rises to place in the rank of type-arms, substantially as described.

6. In a type-writer, the combination, with a rigid frame having inclined converging arms to guide each type-arm to the point of impression, of a series of type-arms carried by a corresponding series of flat plates in which said arms are mounted, a series of plates mounted on a straight shaft side by side, each having lugs between which the bifurcated end of the flat plate carrying the arm is pivoted, a central projection being formed between said lugs and provided with one square and one beveled shoulder on opposite sides of the pivotal axis to limit the lateral swing of the type-arm in both directions, and the lower lug having a corner beveled off at an angle corresponding with the lateral swing of the adjacent type-arm as it rises to place in the rank of type-arms, substantially as described.

7. In a type-writer, the combination, with the paper-carriage having a vibrating rack-plate, the key-bars, and the rest-bar under the latter, of a rigid holding-plate having rack-teeth and a link composed of two sections, one yieldingly movable lengthwise upon the other, the lower section secured at its bottom to and supported by the rest-bar, and the upper section loosely engaging the rack-plate extending above the same and having a sliding engagement with the rigid holding-plate, substantially as described.

8. In a type-writer, the combination, with the paper-carriage having a supporting-bar, of the adjustable spring-plates each cleft at both ends, one cleft end embracing the supporting-bar and the other cleft end supporting a pressure-roller and constituting a shield which extends over the roller, substantially as described.

9. In a type-writer, the combination, with the paper-carriage having a supporting-bar, of the spring-plates each having at one end a pressure-roller and cleft at the other end, with the cleft parts bent under and over the supporting-bar and one of the cleft parts bent vertically and engaging a longitudinal groove in the supporting-bar, substantially as described.

10. In a type-writer, the combination, with the paper-carriage, of a paper rack or receiver composed of a series of wires rigidly attached at one end to a support upon said carriage, thence curved rearwardly and brought up in rear of the impression-cylinder, where guiding-loops are formed projecting toward said cylinder, and thence having their free ends spirally coiled within the attached ends, suitable space being formed for the passage of the paper, substantially as described.

11. In a type-writer, the combination, with the paper-carriage having a supporting-bar, of a series of spirally-coiled wires attached at one end to the rear surface of said bar, and two elastic plates having their ends lying on the upper portion of said bar and the third embracing its lower portion and having its end bent upward to engage a longitudinal slot formed in the lower face of said bar, substantially as described.

12. In a type-writer, the combination, with the paper-carriage, of a pivotally-mounted detent-plate having a stop-tooth upon each side of the pivotal point, either of which may be brought into the path of the said carriage, substantially as described.

13. In a type-writer, an ink-roll frame formed from a single metallic blank having a flat plate at one end and two parallel arms with a central shield-extension at the other end, said blank being provided in its body portion with two half-round apertures and two parallel longitudinal clefts in the transverse line of said apertures, substantially as described.

14. In a type-writer, the combination, with the stationary detachable parts of the frame, of nuts engaging the threaded ends of said detachable parts, said nuts being countersunk at the upper ends of their orifices to surround and conceal the upper threads of the detachable parts, substantially as described.

15. In a type-writer, a pressure-roll carrier consisting of an elastic plate cleft at one end to form two parallel side sections supporting the journals of the pressure-roll, the middle section being curved up over said roll to serve as a shield and a hand-hold, said plate being similarly cleft at the other end to form two outer sections lying on the upper part, and a central section embracing the lower part of the support on which said plate is mounted, substantially as described.

16. In a type-writer, an ink-roll mounted upon a rock-shaft, having at its end a face-cam engaging with a projection upon the supporting-bracket, and a spring drawing the cam against the projection, substantially as described.

17. In a type-writer, the combination, with an ink-roll mounted upon a rock-shaft, the latter having a face-cam at its end, of a projection engaging said cam, a spring drawing the cam against said projection, and means for varying the tension of the spring, substantially as described.

18. In a type-writer, the combination, with a rock-shaft carrying an ink-roll frame and having a face-cam at its end, the cam-surface being angular at one extremity, of a spring coiled on the rock-shaft and resting against a movable collar, a supporting-bracket having lugs in which the rock-shaft is mounted, and against one end of which one end of the spring bears, said lug having a projection engaging the face-cam, and two substantially parallel fingers rigidly mounted on the periphery of the cam, substantially as described.

In testimony whereof we affix our signatures in presence of two witnesses.

JAMES BRADY.
JAMES R. VELLACOTT.

Witnesses:
  JNO. E. GAVIN,
  GEORGE DIXON.